United States Patent Office 3,148,591
Patented Sept. 15, 1964

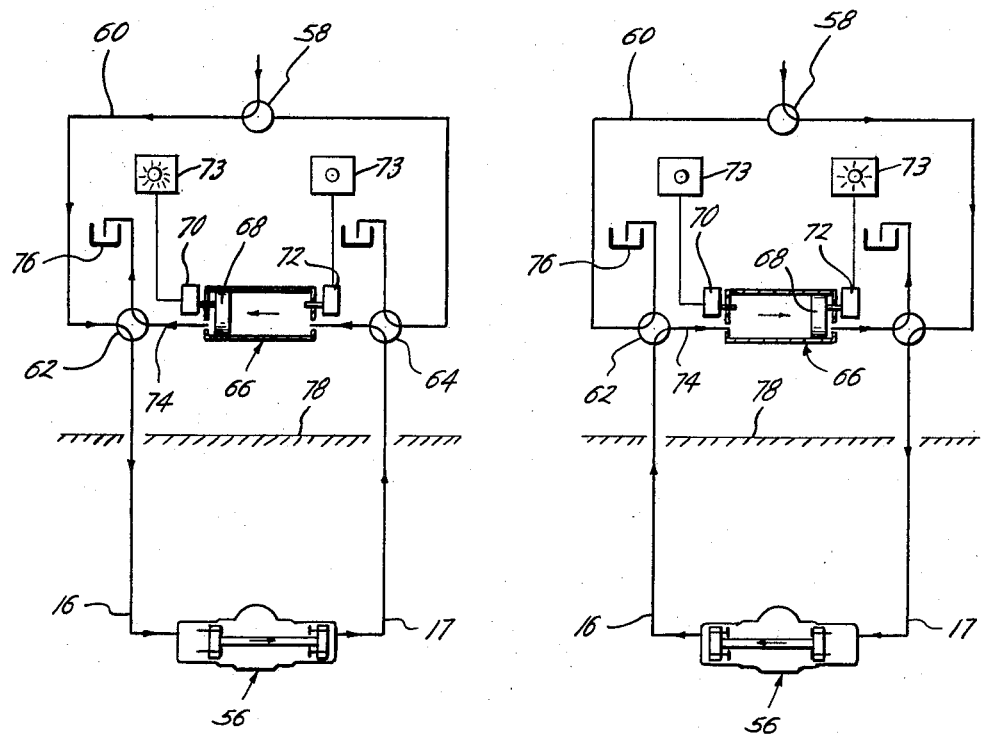

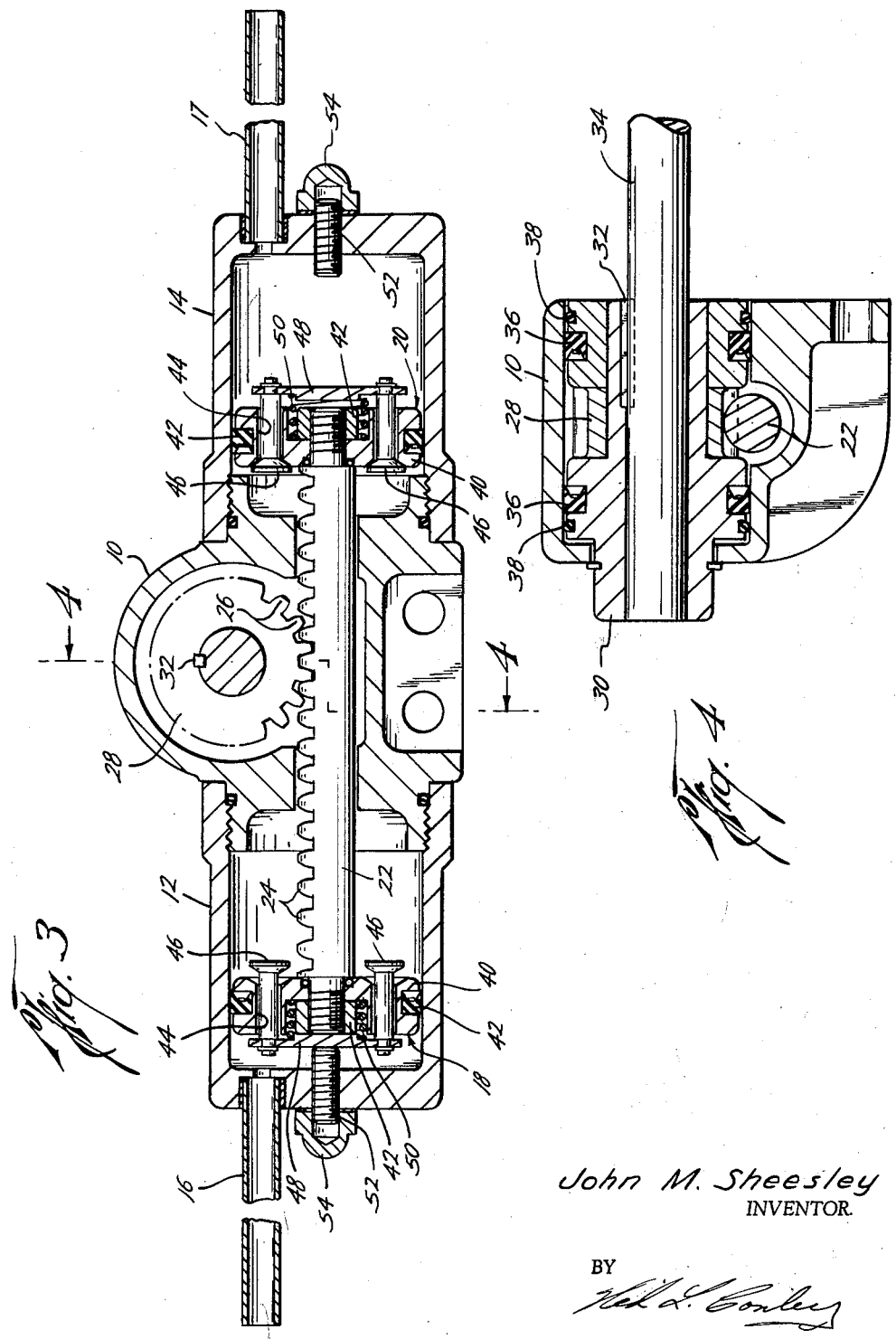

3,148,591
REMOTE CONTROLLED ACTUATOR
John M. Sheesley, P.O. Box 9365, Houston, Tex.
Filed Oct. 25, 1962, Ser. No. 232,990
9 Claims. (Cl. 91—1)

This invention relates to actuators which must be controlled from a position remote from the actuator. More particularly it relates to fluid operated actuators of the type used to operate plug valves, check valves, and other valves, and to improvements by which such actuators may be positioned at an inaccessible location and may be operated from a remote location, with the further provision of means for positively indicating to the operator when such actuators are fully operated.

It is well known in the art to operate plug valves, check valves and other rotary operable apparatus by means of an actuator comprising a fluid cylinder which is engaged with rotary means in such a manner as to translate the longitudinal movement of a piston in the fluid cylinder to rotary movement of the rotary means. Often such actuators must be installed in a position which is inaccessible to the person operating them. Under such circumstances it is extremely difficult to determine whether or not a valve or other apparatus has actually been actuated when pressure is applied to the actuator. For example in actuators of the type previously used the piston may become stuck so that no actual movement of the apparatus occurs, or the plug of a plug valve may become stuck in a partially open position.

Another problem that frequently occurs with such actuators is that they are sometimes located in a sump or in other areas filled with liquids or gases which would contaminate and cause corrosion of the working parts of the actuator if such parts should become exposed. This is particularly a problem with respect to valves and actuators which are located in the bilge or other lower portions of a ship. In such instances it is necessary that positive efforts be taken to insure that no contaminating fluid gets within the actuating device.

It is an object of this invention to provide means for actuating valves and other apparatus which can be installed in a location remote from the person who operates them. It is another object to provide actuating means which are operable from a remote location and means which positively indicate whether or not actuation of apparatus has taken place. Still another object of this invention is to provide an actuator which is fully protected against any contamination by outside fluids such as may be found in the hold of a ship.

For a better understanding of the invention reference is now made to the enclosed drawings wherein:

FIGURE 1 is a schematic view of one embodiment of this invention shown in a first position;

FIGURE 2 is a schematic view of the embodiment of FIGURE 1 shown in a second position;

FIGURE 3 is a longitudinal cross-sectional view of a preferred embodiment of an actuator according to this invention; and FIGURE 4 is a vertical sectional view of the embodiment of the actuator shown in FIGURE 3 taken at line 4—4 of FIGURE 3.

In a preferred embodiment the actuator of this invention comprises, as is shown in FIGURES 3 and 4, a gear housing 10 having sealingly attached thereto opposed fluid valve cylinders 12 and 14. The fluid cylinders 12 and 14 are closed at their outer ends and are provided with fluid conduits 16 and 17 for admitting fluid under pressure. A piston 18 is longitudinally slidably received within cylinder 12 and a piston 20 is longitudinally slidably received within cylinder 14. The pistons are connected by a piston rod 22 which extends longitudinally of the opposed cylinders. Piston rod 22 is provided with teeth 24 so as to form a rack. Teeth 24 engage the teeth 26 of a spur gear 28 which is rotatably mounted within the gear housing 10. The spur gear 28 is, in the embodiment shown, rigidly mounted upon a mandrel 30, which in turn is keyed, by means of a key 32, to a shaft 34, which may for example be the stem of a valve to be actuated. Mandrel 30 is sealingly disposed within the housing 10 by means of packing rings 36 and O-rings 38.

Each of pistons 18 and 20 comprises a piston body 40 which is retained on a reduced end portion of the piston rod 22 by means of a nut 42. A lip type packing ring 42 surrounding each piston body has its lip directed inwardly toward the gear housing and toward the other piston so as to prevent flow around the piston in a direction away from the other piston but to allow flow around each piston in a direction toward the other piston. Each piston is provided with at least one valve port 44 extending longitudinally therethrough. In the embodiment shown two such valve ports are provided for each piston. A check valve 46 is provided in each valve port and is adapted to close the valve port to prevent the flow of fluid through such port in a direction away from the gear housing. The stems of the valves 46 in each piston are connected to a valve plate 48, and a compression spring 50 is provided between the valve plate and the piston body 40. The compression spring 50 urges the valve plate away from the body and therefore resiliently urges the valves 46 towards a closed position. At the outside end of each cylinder an adjusting screw 52 is preferably provided. An acorn nut 54 is used to lock the adjusting screw in place and to provide a seal against the end of the cylinder.

It will be seen that upon the application of fluid under pressure through one of the conduits 16 or 17 to, for example, fluid cylinder 12, the fluid under pressure will flow past the packing ring 42 of piston 18 and will fill the cylinder 12, the gear housing 10, and the portion of cylinder 14 between piston 20 and the gear housing. The pressure will then cause the piston 20 to move to the right, as seen in FIGURE 3, until the valve plate 48 contacts adjusting screw 52. Such contact will cause the valves 46 to open so that fluid flows through the piston 20, thereby equalizing the pressure on both sides of the piston and stopping the piston movement. Adjusting screw 52 may be positioned as desired to regulate the length of stroke.

Upon the application of pressure from the other direction, that is through conduit 17 into cylinder 14, fluid pressure will flow past piston 20 and will cause a pressure to be exerted upon all the space between pistons 18 and 20. However the valves 46 of piston 18 are closed and the packing rings 42 on this piston are so directed as to prevent fluid passage around piston 18 in the direction away from piston 20, and therefore the pressure applied coming from cylinder 14 will cause the piston 18 to move to the left as viewed in FIGURE 3. This movement will of course cause fluid within the cylinder 12 to be displaced from the cylinder through conduit 16. When the piston 18 moves far enough for the valve plate 48 to contact the adjusting screw 52 the valves 46 are opened so that movement of the piston 18 is stopped and pressure fluid bypasses the piston and flows outwardly through conduit 16.

It will be apparent that movement of the pistons and piston rod in either direction will cause rotation of the spur gear 28 and will thereby cause shaft 34 to be rotated.

Reference is now made to FIGURES 1 and 2 for a description of the remote control and indicating apparatus of this invention. In FIGURE 1 an actuating device such as for example the embodiment shown in FIGURES 3 and 4 is indicated at 56. Fluid under pressure is provided to the actuating device through a 3-way valve 58 from which fluid flows through a conduit 60 through a 4- way valve 62 and then through conduit 16 to one end of the actuating device. Movement of the pistons in the actuating device then causes the fluid to flow out through conduit 17 through a 4-way valve 64 to a position indicator containing a fluid actuated movable barrier, as for example cylinder 66.

The position indicator cylinder 66 comprises a cylinder containing a longitudinally movable piston 68 and having at each end a limit switch 70, 72 which is positioned to be actuated upon movement of the piston 68. The displacement of the piston 68 during movement from a first position adjacent one end of the cylinder 66 to a position in contact with one of the limit switches 70, 72 is preferably substantially greater than the displacement of one of the pistons 18, 20 in the actuating device. Thus the pistons 18 and 20 may be moved from one end of the actuating device cylinders to the other while forcing out of the actuating device a sufficient amount of fluid to move the piston 68 only a portion of the distance towards one of the switches 70, 72. Thereafter however, the opening of the valves 46 allows additional fluid to by-pass the pistons 18, 20 and such additional fluid is conducted to the cylinders 66 to cause additional movement of the piston 68 until it contacts a limit switch 70, 72. The switches 70 and 72 may energize a light 73 or a buzzer, a bell, or other indicator to indicate to the operator that the actuating device has been operated so that he may shut off the flow of pressure fluid to the actuating device. Alternatively the switch 70 may be connected directly to means well known in the art for operating the fluid pressure supplying apparatus so as to automatically shut off the supply of pressure fluid to the actuating device.

Fluid exhausted from the position indicator cylinder 66 flows through a conduit 74 through valve 62 and into a reservoir 76.

It is apparent that upon movement of the actuating device in one direction the position of various valves and pistons is as shown in FIGURE 1 whereas upon movement of the actuating device in the other direction the positions of these valves and pistons are changed to those shown in FIGURE 2.

Due to the fact that the fluid under pressure does not act upon the piston at the end to which the pressurized fluid is fed but instead by-passes this piston and acts upon the opposite piston, the entire chamber within the actuating device is maintained full of fluid under pressure at all times. This fluid will normally be at a pressure of somewhere between 50 and 1000 pounds per square inch, which will in substantially all cases be sufficient to insure that no contaminated fluids enter the housing. If there is any leakage in the housing such leakage will be leakage of the pressure fluid to the outside of the housing and will not involve any leakage of contaminants into the housing.

In FIGURES 1 and 2, 78 denotes a ship deck or other wall which is in between the actuating device and the operating and indicating portion of the apparatus of this invention and which prevents access to the actuating device. It will be apparent that an operator upon operating valve 58 to supply fluid to the actuating device 56 may, by means of the indicators energized by switches 70 and 72, positively determine whether or not the actuating device has operated. Since the volume of displacement of piston 68 is greater than the volume displaced by the pistons in the actuating device the piston 68 cannot contact one of the limit switches 70 or 72 until one of the pistons in the actuating device has reached the end of the stroke and allowed fluid under pressure to by-pass the pistons 18 and 20 and flow into the cylinder 66, thereby providing additional fluid for movement of piston 68 into contact with one of the switches. If instead of this the pistons in the actuating device become stuck or the valve becomes stuck so that it cannot be operated, the check valves in the pistons 18 and 20 will not open, so that fluid cannot flow to the position cylinder and therefore no signal of completion of operation will be received.

Although preferred embodiments of the invention have been shown and described herein the invention is not limited to such embodiments but only as set forth by the following claims.

I claim:
1. Apparatus comprising
   fluid operated actuating means having a first position and a second position,
   means for supplying fluid under pressure to said actuating means to move it from said first position to said second position,
   fluid by-pass means for by-passing said fluid upon movement from said first position to said second position, and
   means operable in response to said by-passed fluid to indicate the movement of said actuating means.
2. Apparatus comprising
   a fluid cylinder,
   a piston movable longitudinally in said cylinder from a first position to a second position in response to the application of fluid pressure thereto,
   means for applying fluid under pressure to said piston,
   fluid by-pass means for by-passing fluid upon movement of said piston from said first position to said second position, and
   means operable in response to said by-passed fluid to indicate the movement of said piston.
3. Apparatus as defined by claim 2 wherein said by-pass means comprises a valve which is actuated to open a port through said piston when the piston moves to said second position.
4. Apparatus as defined by claim 2 wherein the indicating means comprises
   a position indicator cylinder,
   a piston in said position indicator cylinder longitudinally movable therethrough,
   means for conducting by-pass fluid from said fluid cylinder to said position indicator cylinder,
   a switch in said cylinder adapted to be actuated by the last-named piston upon movement thereof, and
   an indicator operably connected to said switch for energization upon actuation of said switch.
5. Actuating apparatus comprising
   a pair of opposed fluid cylinders,
   a fluid-tight gear housing between said cylinders and in communication therewith,
   a piston in each of said cylinders each movable in response to fluid pressure applied thereto from a first position to a second position,
   a piston rod extending through said gear housing and connecting said pistons,
   means on each piston allowing fluid flow past it in a direction toward the other piston but preventing fluid flow in a direction away from the other piston,
   means for supplying fluid under pressure to each cylinder, and
   valve means in each piston adapted to be opened to by-pass fluid therethrough upon movement of the piston to its second position.
6. Apparatus as defined by claim 5 and further including a position indicator comprising
   an indicator cylinder,
   an indicator piston longitudinally slidably positioned in said indicator cylinder and adapted to be moved, upon the application of fluid pressure thereto, from a first indicating position to a second indicating position,
   the displacement of said indicating piston being greater than the displacement of the other pistons,
   a limit switch at each end of the stroke of the indicator piston each adapted to be actuated by the indicator piston at one of its indicator positions, and means for conducting fluid from each of the opposed fluid cylinders to said indicator cylinder.

7. Apparatus as defined by claim 5 and further including
means operable in response to said by-passed fluid to indicate the movement of said pistons from said first position to said second position.

8. Apparatus comprising
fluid operated actuating means having a first position and a second position,
means for supplying fluid under pressure to said actuating means to move it from said first position to said second position,
fluid by-pass means for by-passing said fluid upon movement from said first position to said second position,
a fluid operated position indicator,
a movable barrier in said position indicator adapted to be moved to an indicating position upon application of fluid pressure thereto, and
means for conducting exhausted fluid from said actuating means to said position indicator for application to said movable barrier.

9. Apparatus as defined by claim 8 wherein the amount of fluid required to move said movable barrier to said indicating position is greater than the amount of fluid required to move said actuating means from said first position to said second position.

References Cited in the file of this patent

UNITED STATES PATENTS

| | | |
|---|---|---|
| 2,359,949 | Van Der Werff | Oct. 10, 1944 |
| 2,389,654 | Van Der Werff | Nov. 27, 1945 |
| 2,703,558 | Wilcox | Mar. 8, 1955 |
| 2,851,014 | Healy | Sept. 9, 1958 |